(12) United States Patent
Benesch et al.

(10) Patent No.: US 10,523,105 B2
(45) Date of Patent: Dec. 31, 2019

(54) METHOD FOR OPERATING AN INVERTER SYSTEM AND INVERTER SYSTEM WORKING ACCORDING TO SAID METHOD

(71) Applicant: SIEMENS AKTIENGESELLSCHAFT, München (DE)

(72) Inventors: Norbert Benesch, Heroldsberg (DE); Benno Weis, Hemhofen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 16/095,238

(22) PCT Filed: Feb. 9, 2017

(86) PCT No.: PCT/EP2017/052852
§ 371 (c)(1),
(2) Date: Oct. 19, 2018

(87) PCT Pub. No.: WO2017/182152
PCT Pub. Date: Oct. 26, 2017

(65) Prior Publication Data
US 2019/0149034 A1 May 16, 2019

(30) Foreign Application Priority Data
Apr. 20, 2016 (EP) ..................................... 16166228

(51) Int. Cl.
*H02M 1/12* (2006.01)
*H02M 7/5395* (2006.01)
(Continued)

(52) U.S. Cl.
CPC ............. *H02M 1/126* (2013.01); *H02M 1/12* (2013.01); *H02M 7/5395* (2013.01); *H02M 1/44* (2013.01); *H02M 2001/0009* (2013.01)

(58) Field of Classification Search
CPC ...... H02M 1/126; H02M 7/5395; H02M 1/12; H02M 2001/0009; H02M 1/44;
(Continued)

(56) References Cited

U.S. PATENT DOCUMENTS 6,762,705 B2  7/2004  Bruckmann et al.
6,943,611 B2  9/2005  Braun et al.
(Continued)

FOREIGN PATENT DOCUMENTS

DE     102008018497 A1     10/2009
DE     10 2009 049 820     4/2011
(Continued)

OTHER PUBLICATIONS

Cao Bo et al: "A variable switching frequency algorithm to improve the total efficiency of single-phase grid-connected inverters", Applied Power Electronics Conference and Exposition (APEC), 2013 Twenty-Eighth Annual IEEE, pp. 2310-2315, XP032410652, DOI: 10.1109/APEC.2013.6520617, ISBN: 978-1-4673-4354-1, abstract, sections II, III; 2013.
(Continued)

*Primary Examiner* — Alex Torres-Rivera
(74) *Attorney, Agent, or Firm* — Henry M. Feiereisen LLC

(57) ABSTRACT

In a method for operating an inverter system and a corresponding inverter system, which includes from the network filter to the inverter, values are determined using the data unit, and a value spectrum of the determined values is determined using an evaluation unit. The value spectrum is compared to a predetermined or predefinable limit spectrum
(Continued)

using an assessment unit, and a switching frequency of the inverter can be adapted while in operation by using an adapter unit arranged downstream of the data unit, the evaluation unit and the assessment unit in the return path.

7 Claims, 5 Drawing Sheets

(51) Int. Cl.
*H02M 1/44* (2007.01)
*H02M 1/00* (2006.01)

(58) Field of Classification Search
CPC .......... H02M 7/42; H02M 2007/4815; H02M 2007/4818; H02M 7/523; H02M 7/525; H02M 7/527; H02M 7/529; H02M 7/66; H02M 7/758
See application file for complete search history.

(56) References Cited

U.S. PATENT DOCUMENTS

| | | |
|---|---|---|
| 7,983,060 B2 | 7/2011 | Benesch |
| 2003/0179021 A1 | 9/2003 | Braun et al. |
| 2009/0285002 A1 | 11/2009 | Benesch et al. |
| 2013/0033907 A1 | 2/2013 | Zhongyuan |
| 2013/0335058 A1* | 12/2013 | Mercer ............... H02J 1/06 323/318 |
| 2015/0340943 A1* | 11/2015 | Sodo ............... H02M 1/12 318/474 |
| 2016/0111970 A1* | 4/2016 | Nate ............... H02M 1/12 315/201 |
| 2017/0166064 A1* | 6/2017 | Chen ............... B60L 50/15 |

FOREIGN PATENT DOCUMENTS

| | | |
|---|---|---|
| JP | 2015130752 A | 7/2015 |
| WO | WO 2008028794 A1 | 3/2008 |
| WO | WO 2014033331 A2 | 3/2014 |

OTHER PUBLICATIONS

PCT International Search Report and Written Opinion of International Searching Authority dated Sep. 7, 2017 corresponding to PCT International Application No. PCT/EP2017/052852 filed Feb. 9, 2017.

PCT International Preliminary Examination Report and Written Opinion of International Examination Authority dated Aug. 24, 2018 corresponding to PCT International Application No. PCT/EP2017/052852 filed Feb. 9, 2017.

Becker et al., U.S. Pat. No. 8,116,108, Feb. 14, 2012, 2010/0008118, Jan. 14, 2010.

Norbert Benesch, U.S. Pat. No. 8,130,523, Mar. 6, 2012, 2010/0008115, Jan. 14, 2010.

Benesch et al., U.S. Pat. No. 9,812,872, Nov. 7, 2017, 2015-0035366, Feb. 5, 2015.

Schierling et al., U.S. Pat. No. 8,743,572, Jun. 3, 2014, 2011/0187480, Aug. 4, 2011.

Dillig et al., U.S. Pat. No. 8,873,207, Oct. 28, 2014, 2013-0170077, Jul. 4, 2013.

Dillig et al., U.S. Pat. No. 9,007,790, Apr. 14, 2015, 2013-0235618, Sep. 12, 2013.

* cited by examiner

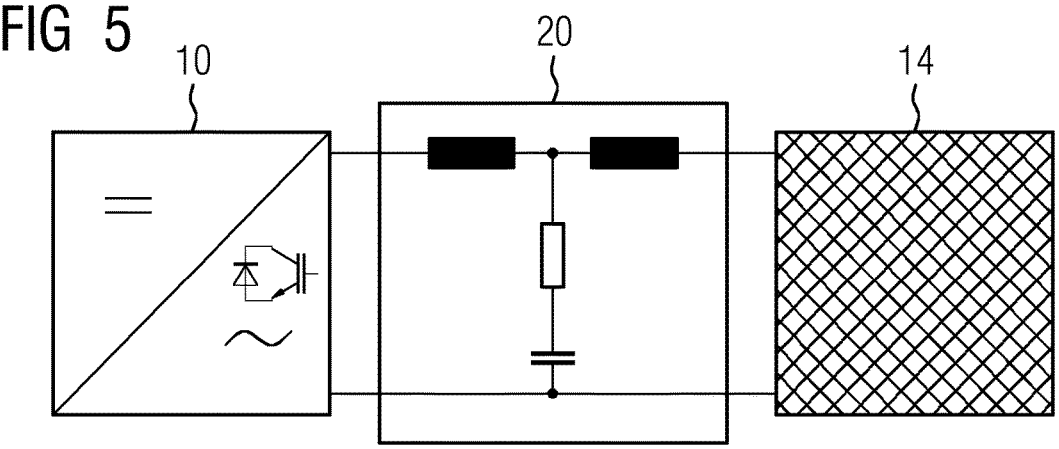
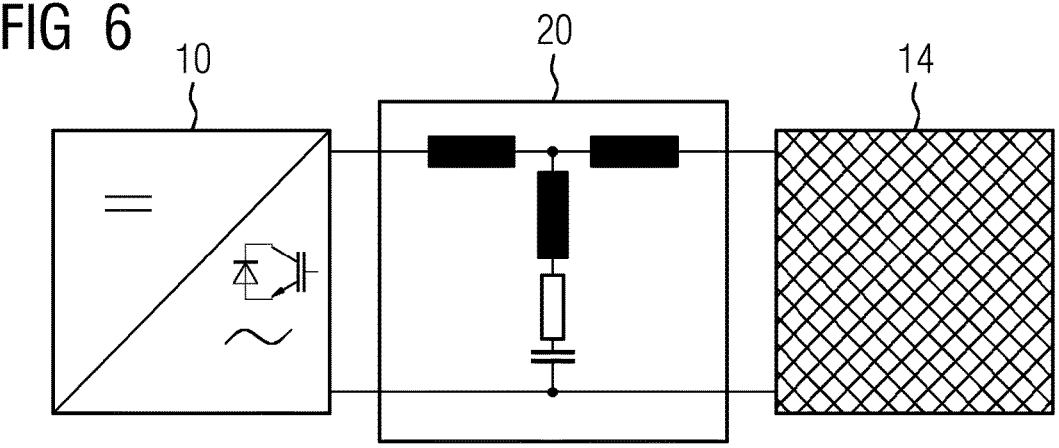
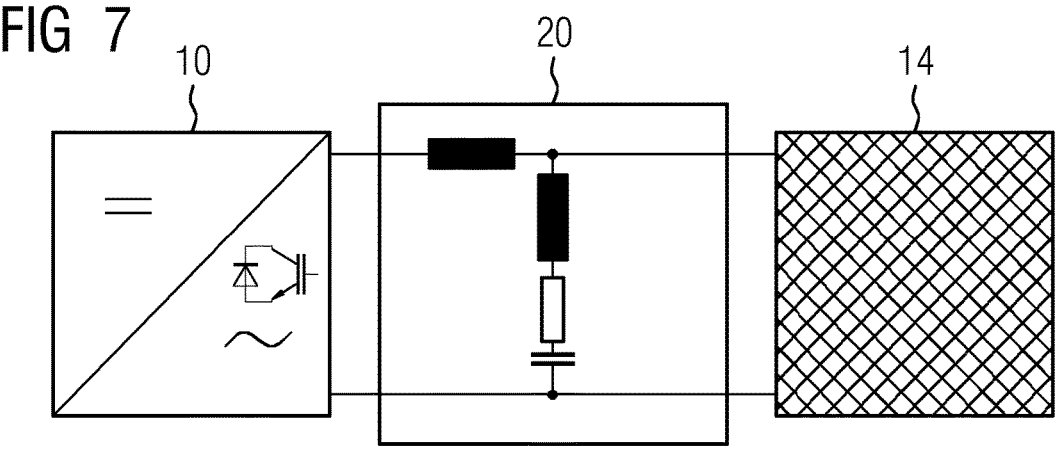

METHOD FOR OPERATING AN INVERTER SYSTEM AND INVERTER SYSTEM WORKING ACCORDING TO SAID METHOD

CROSS-REFERENCE TO RELATED APPLICATIONS

This application is the U.S. National Stage of International Application No. PCT/EP2017/052852, filed Feb. 9, 2017, which designated the United States and has been published as International Publication No. WO 2017/182152 and which claims the priority of European Patent Application, Serial No. 16166228.3, filed Apr. 20, 2016, pursuant to 35 U.S.C 119(a)-(d).

BACKGROUND OF THE INVENTION

The invention relates to a method for operating an inverter system and also to an inverter system working according to said method. An inverter system in this case is interpreted as a network-connected inverter together with a network filter connected upstream thereof on the network side.

Active network-connected inverters are typically used for exchange of energy between an AC network and a DC link circuit in each case. They are therefore of great importance both for drive systems, wherein motor inverters use the regulated DC voltage as their input, and also increasingly for energy generation and energy storage, for example with a battery in the DC link circuit.

A characteristic of active network-connected inverters (FIG. 1) is the capability for effective power exchange in both directions, i.e. from the network into the link circuit to supply a drive and also in the opposite direction, in order for example to feed braking energy or stored energy or energy generated with PV modules into the network. In addition capacitive or inductive reactive power can also be output.

As with motor-side inverters, this is done in the prior art with switching semiconductor elements, for example IGBTs in a B6 bridge circuit. Through fast switching between two or more voltage stages an approximately continuous curve of the AC output voltage can thus be created over a switching or pulse period. Depending on the technology and output power used, the switching/pulse frequencies (for reasons of consistency the term switching frequency or switching frequencies is used below under all circumstances) lie between a few 100 Hz and a few 100 kHz, typically they are 2 kHz to 20 kHz.

The AC output voltage of a pulse inverter, in addition to the fundamental wave (network frequency) and low frequency network harmonics, thus also contains components at the switching frequency (with sidebands) and their multiples. As well as the desired fundamental wave, the low-frequency network harmonics can be regulated-out or at least reduced by a regulation of the inverter. The unwanted frequency components on the other hand, that are caused by the switching of the power semiconductors, must be reduced by suitable switching technology means, usually in the form of network filters, far enough for the connection standards relevant in each case at the Point of Common Coupling (PCC) to be adhered to and for other devices in the network not to be disrupted.

The diagram in FIG. 2 shows an example of the frequency curve of such a network filter with reference to the transmission function between inverter output voltage and resulting voltage at the PCC. Above the (actually unwanted) resonance point, a better reduction of the switching-frequency voltage disruptions is achieved with increasing frequency. For the layout of the system as a whole, the aim is to achieve an optimum from conflicting requirements:

On the one hand the inductance values in the filter should be as small as possible, in order to minimize costs and filter size. However the resonance point is shifted by this to higher frequencies and the effect reduces at a specific switching frequency (above the resonance).

On the other hand the switching frequency should be as low as possible, in order to keep the switching losses in the inverter small and the efficiency high. A reduction of the switching frequency however (with the given filter) leads in its turn to a lower filter effect and thus to increased switching-frequency components in the PCC voltage.

The task of the system developers is therefore to find an optimum possible compromise between filter outlay and switching frequency. The point to be considered in this case is that the filter effect is also strongly dependent on the network inductance. If specific values for the switching-frequency interference voltages are to be adhered to, then assumptions must be made in relation to the network inductance to be expected and the system must be designed for a worst-case scenario.

The following equation applies for the relationship between network inductance $L_N$ and relative short-circuit voltage $u_K$ $$u_K = \frac{2\pi f_{Netz} L_N S_{KS}}{U_{Netz}^2}$$

with the short-circuit power $S_{KS}$ of the network. For the situation shown by way of example in FIG. 2 it is thus approximately true to say in simple terms that the filter for the case with $u_K=1\%$ must be dimensioned too large by a factor of 5, so that even with $u_K=10\%$, a specific limit value for the switching-frequency interference can be adhered to.

If the characteristics of the network are known in advance and are approximately constant, then the filter and/or the system could be adapted in a cost-optimal way. As a rule however, this knowledge is not available and moreover the network parameters can vary greatly over time. Thus the system has to be equipped with attenuation that may not be needed and account has to be taken of corresponding component costs and/or unnecessary switching losses.

SUMMARY OF THE INVENTION

Using this as its starting point, an object of the present invention consists of specifying a method for operation of an inverter system, by means of which the inverter system is operated in an optimal operating point, so that component costs are minimized or at least reduced and the efficiency is maximized or at least enhanced.

To achieve this object an expansion of the inverter system and a method for its operation is proposed in accordance with the invention.

The expansion of the inverter system consists of at least the voltage at the point of common coupling of the network being measured or comparable values being determined, in particular being determined numerically, and as a result of an automated evaluation of corresponding measured values or values, the switching frequency being adapted automatically. The switching frequency is continuously selected so that all limit values valid in the respective application for the switching-frequency component of the output voltage are adhered to. Optionally the switching frequency is continuously selected in this case so that a lowest possible switching frequency is produced, in order to keep the switching losses in the inverter small and the efficiency high.

The invention is thus a method for operating an inverter system, wherein the inverter system comprises an inverter, a network filter and, for automatic adaptation of the switching frequency, a signal path from the network filter to the inverter also referred to below as the return path. In the return path individual functional units follow on from one another in signaling terms, namely a data unit or a measuring unit functioning as a data unit/data acquisition unit, an evaluation unit, an assessment unit and an adapter unit. By means of the data unit values or measured values are determined or acquired at a network-side point of common coupling of the inverter, for example voltage measurement values, in relation to current interference emitted by the inverter. By means of a measuring unit functioning as a data acquisition unit the respective values are acquired directly as measured values. By means of a data unit in a general form values, as are basically able to be acquired by means of a measuring unit, can also be established numerically. Such numerically established values are equal in value to measured values acquired by sensors and will likewise be referred to below for short as measured values, to avoid repetition of formulations as "values or measured values". By means of the evaluation unit a value spectrum of the acquired measured values is established/calculated. By means of the assessment unit the value spectrum is compared with a predetermined or predefinable limit spectrum and by means of the adapter unit terminating the return path and assigned to the inverter, depending on the result of the comparison, a switching frequency of the inverter is adapted.

The invention is likewise an inverter system with means for carrying out the method and also if necessary individual forms of embodiment of the method described below, in particular an inverter system with the features of the parallel independent device claim. A frequency curve of the network filter of the inverter system is designed in this case so that it results in a sufficient large working range with monotonously increasing attenuation.

The measured values at the Point of Common Coupling PCC can be determined/acquired during operation of the inverter. Then, by means of the respective measured values, the current interference emission of the inverter is also acquired. The determination/acquisition can take place for example even during pulse inhibition of the inverter and accordingly the adaptation of the switching frequency can take place independently in time of the determination/ acquisition. The adapted switching frequency will then be used after a pulse enabling for the inverter as its initial switching frequency and the adapted switching frequency starts for example from a switching frequency predetermined for the respective mode of operation or an average switching frequency during a switching period.

DE 10 2009 049 820 A1 discloses a method for reducing system perturbations of an inverter. To avoid an excitation of resonance points a resonance point of the network impedance is established, so that the switching frequency of the inverter can be changed in such a way that the resulting switching frequency no longer hits this resonance point.

The advantage of the invention lies in that fact that, by means of the return path, a closed control loop is present for the adaptation of the switching frequency of the inverter, wherein a quality criterion, which describes the instantaneous deviation of a respective interference spectrum from its local (temporally and spatially) allowed limit value is used as a closed-loop control variable.

For operation in a network with a high short-circuit power, the switching frequency can be adapted, in particular reduced, with the approach proposed here, and consequently the efficiency of the inverter enhanced. For the operator of the inverter it can be worthwhile in economic terms to invest in a powerful network, since fewer energy losses arise and moreover less waste heat has to be dissipated. Moreover a standards-compliant operation can be guaranteed (at least for some of the time) in very low-power networks. To this end the switching frequency is suitably increased automatically, taking account of increased switching losses (which may possibly lead to a derating of the inverter).

Where the adaptation of the switching frequency leads to a reduction of the switching frequency, a reduction of the switching losses and thus as a rule an improvement in the overall efficiency is achieved, if a network with high quality is available at that moment. Moreover, because of a reduced switching frequency, lower losses result in the power semiconductors of the inverter. This leads to lower semiconductor temperatures and thus on average to an increased lifetime of the inverter, specifically when operated with a mixed load. To this extent the method in accordance with the approach proposed here can also be used explicitly—with a suitable network quality—in order to reduce the thermal load on the inverter in overload situations. Furthermore future guidelines are defining increased requirements for the efficiency under part load. Lowering of the switching frequency is sensible for this in particular and is also able to be used for the network side with the proposed method.

Advantageous embodiments of the invention are the subject matter of the subclaims. References used in such cases refer to the further embodiment of the main claim by the features of the respective subclaim. They are not to be understood as dispensing with achieving a natural objective protection for the combinations of features of the referenced subclaims. Furthermore, with respect to an arrangement of the claims for a more specific definition of a feature in a subordinate claim, it is to be assumed that a restriction of this sort is not present in the preceding claims in each case. Finally it should be pointed out that the method specified here can also be developed in accordance with the dependent device claims and vice versa.

In one form of embodiment of the method, voltage and/or current values are determined by means of the data unit or measured voltage values and/or measured current values (output voltage and/or output current) at the network filter by means of a measuring unit functioning as a data unit/data acquisition unit. By means of the evaluation unit a voltage, current or power spectrum is established from said values and this is compared by means of the assessment unit with a corresponding limit spectrum or with a corresponding limit spectrum in each case. The switching frequency is then adapted on the basis of an evaluation of a quality of a current spectrum, voltage spectrum and/or a power spectrum.

In a further form of embodiment of the method the values determined by means of the data unit or by a measuring unit functioning as a data unit or acquired measured values, namely the acquired measured values at the network-side point of common coupling of the inverter, in particular the measured values (output voltage and/or output current) acquired relating to the current interference emission of the inverter, are acquired with such a high sampling frequency that the entire relevant interference spectrum or indeed at least essentially the entire relevant interference spectrum can be calculated.

Again in yet another form of embodiment of the method a relative overall interference power of the output voltage and/or of the output current is established by means of the assessment unit and this is additionally taken into consideration for comparison of the value spectrum with the limit spectrum in the adaptation of the switching frequency of the inverter. In this way there can be extra assurance that the respective overall interference power is not exceeding a predetermined or predefinable limit value.

For a specific form of embodiment of the method the values or measured values are determined or acquired (established numerically or measured) by means of the data unit during an operating situation, in which the inverter is not switching (pulse inhibition). The switching frequency adapted by means of the adapter unit is therefore not used immediately in conjunction with the determination/acquisition of the values/measured values, but only later, namely when the pulse inhibition has been canceled and accordingly the operating situation in which the inverter is not switching is ended or will be ended. In this way any possible preloading of the network can be established and the switching frequency adapted thereto. Optionally there can also be information given to the user if it is not possible to adhere to the limit values despite adaptation of the switching frequency.

The object stated above is also achieved with a control device for control of an inverter, which works in accordance with the method described here and below and for this purpose comprises means for carrying out the method. In this case the invention is preferably implemented in software or in software and firmware. The invention is thus on the one hand also a computer program with program code instructions that can be carried out by a computer and on the other hand a storage medium with a computer program of this type, i.e. a computer program product with program code means, and also ultimately also a control unit, in the memory of which such a computer program is loaded or is able to be loaded as a means for carrying out the method and its embodiments. When method steps or sequences of method steps are described below, these relate to actions that occur automatically as a result of such a computer program or automatically under control of the computer program.

Instead of a computer program with individual program code instructions, the method described here and below can also be implemented in the form of firmware. It is clear to the person skilled in the art that, instead of an implementation of a method in software, an implementation in firmware or in firmware and software or in firmware and hardware is always possible. Therefore, for the description set out here, it is to apply that the term software or the term computer program can also include other implementation options, namely in particular an implementation in firmware or in firmware and software or in firmware and hardware.

An exemplary embodiment of the invention is explained in greater detail below with reference to the drawing. Objects or elements corresponding to one another are labeled with the same reference characters in all figures.

BRIEF DESCRIPTION OF THE DRAWING

The exemplary embodiment is not to be understood as a restriction of the invention. Rather, within the framework of the present disclosure, expansions and modifications are readily possible, in particular those that for example, by combination or variation of individual features or method steps described in conjunction with the general or specific part of the description as well as contained in the claims and/or the drawings, are able to be obtained by the person skilled in the art in respect of achieving the object and lead through combinable features to new subject matter or to new method steps or sequences of method steps.

In the figures

FIG. 5 shows an LCL filter, FIG. 6 shows a choked LCL filter with attenuation and also FIG. 7 shows an LZ filter with attenuation.

DETAILED DESCRIPTION OF PREFERRED EMBODIMENTS

Figure 1:
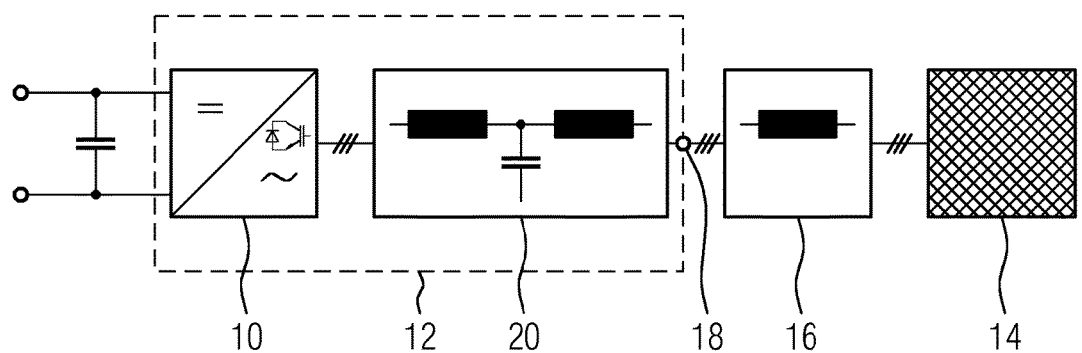
FIG. 1 shows a network-connected inverter connected to a supply network, which, together with an upstream network filter, forms an inverter system.

The diagram in FIG. 1 shows—as already mentioned at the start—an active network-side inverter (network-connected inverter) 10. This is shown as part of an inverter system 12 and will also be referred to for short as an inverter 10 below. Shown on the far right in the diagram in FIG. 1 is the supply network 14. An inductance of the network 14 is shown separately as network inductance 16. The inverter system 12 is connected to the network 14 as a three-phase connection at a network connection point referred to below as the Point of Common Coupling (PCC) 18. A network filter 20 is connected upstream of the inverter 10. Inverter 10 and network filter 20 together form the inverter system 12.

Figure 2:
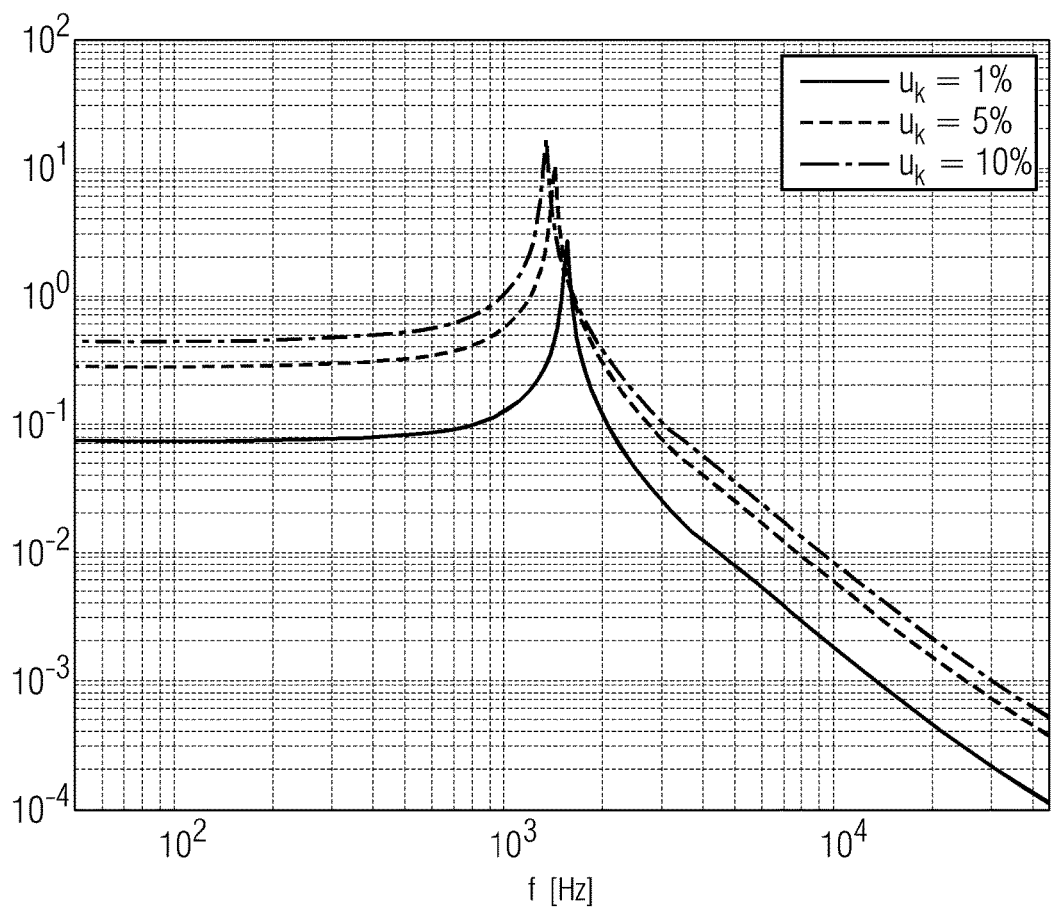
FIG. 2 shows a frequency curve of a network filter.

The diagram in FIG. 2 shows the frequency curve already mentioned at the start of a non-choked LCL filter functioning as a network filter 20 with reference to the transmission function between the output voltage of the inverter 10 and the resulting voltage at the Point of Common Coupling (PCC) 18.

Figure 3:
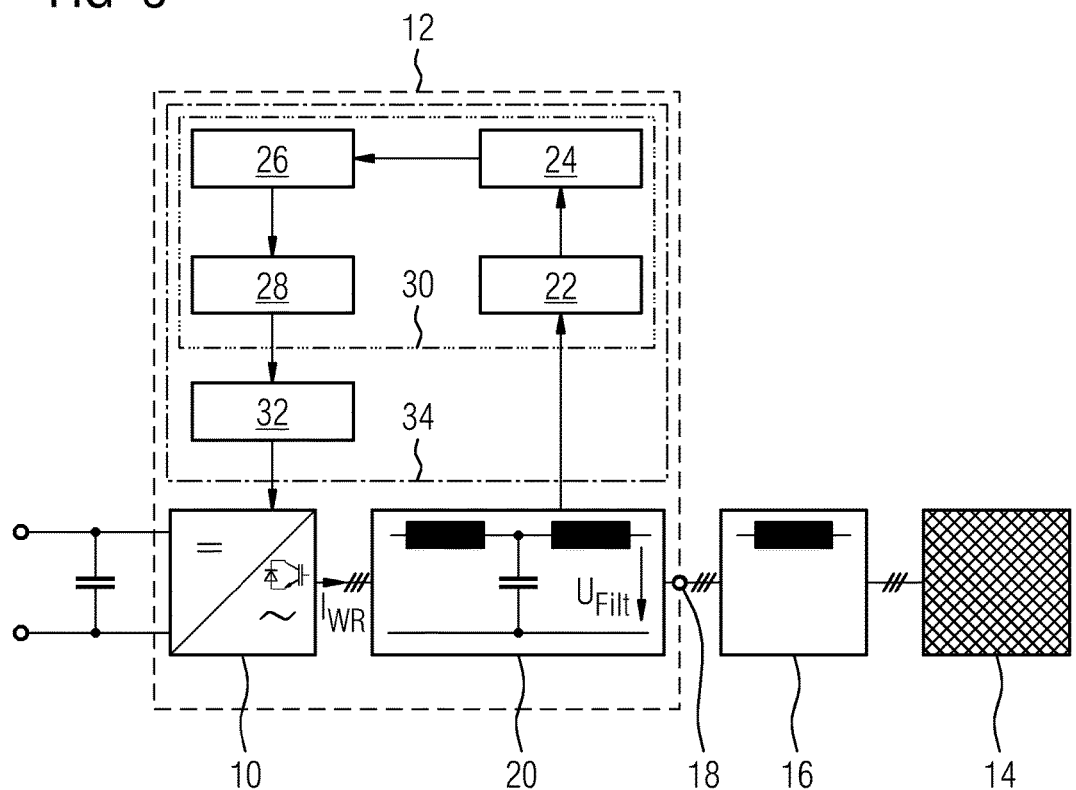
FIG. 3 shows a form of embodiment of the inverter system proposed here.

The diagram in FIG. 3 shows a form of embodiment of the inventive inverter system 12. Along with the inverter 10 and the network filter 20, this comprises a signal path from the network filter 20 to the inverter 10, so that the inverter system 12 is shown as a feedback system. Located in the signal path from the network filter 20 to the inverter 10 are a data unit 22, an evaluation unit 24, an assessment unit 26 and an adapter unit 28, which can also be combined in the form of one or more units. In any event the data unit 22, the evaluation unit 24, the assessment unit 26 and the adapter unit 28 are referred to together as the return path 30.

In the form of embodiment shown, the data unit functions as a data acquisition unit 22 and as a measuring unit 22. On this basis—however without dispensing with any ongoing general applicability—the further description will be continued and the measuring unit 22 will be designated with the same reference number. Basically however it is to continue to be understood in any mention of a measuring unit 22 that the measured values acquired by means of the measuring unit 22 through measurement can also be determined numerically, so that a measurement can then be dispensed with. Correspondingly the term "measured value" is to be broadly interpreted in conjunction with the description presented here and comprises not only values actually established by measurement, but also numerically established values of system variables, which could basically be determined directly or indirectly by measurement.

The adapter unit 28 controls a modulator 32 or the like basically known per se, which for its part controls the power semiconductors included in the inverter 10. The adapter unit 28 and the modulator 32 can be combined into one functional unit. The totality of the functional units 22-28, 32 mentioned forms a control unit 34 of the inverter system 12. The Functionality of individual or of all functional units 22-28, 32 or of the control unit 34 as a whole can be implemented in hardware, software and/or firmware, for example by the control unit 34 comprising a processing unit not shown, in the form of or as a type of microprocessor and by a computer program executed during operation of the inverter system 12 by means of the processing unit being loaded into a memory of the control unit 34 likewise not shown, which comprises an implementation of the functionality of individual or of all functional units 22-28, 32 in software.

The voltage at the connection point/Point of Common Coupling (PCC) 18 is measured by means of the measuring unit 22. A spectral evaluation of the voltage measured by means of the measuring unit 22 is undertaken by means of the evaluation unit 24. The spectral evaluation is undertaken for example by means of Fast Fourier Transformation (FFT) and the evaluation unit 24 accordingly includes an implementation of an FFT algorithm. The evaluation unit 24 can accordingly also be interpreted in such a version as a Fourier transformer. By means of the assessment unit 26 an assessment of a resulting value spectrum at the output of the evaluation unit 24 is undertaken in relation to an adherence to defined limit values, as will be described below. On the basis of a respective output of the assessment unit 26, the adapter unit 28 brings about an increase or a reduction of the average switching frequency of the inverter 10.

Figure 4:
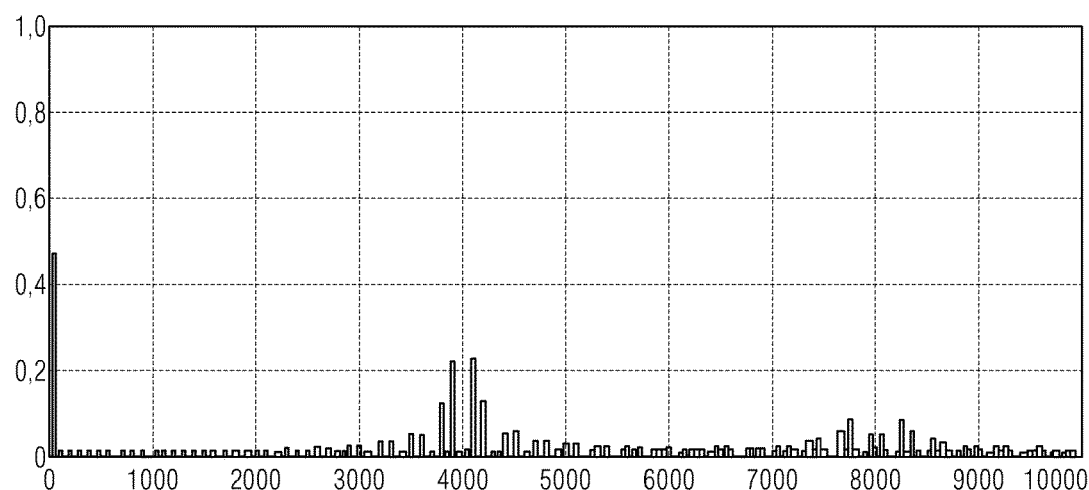
FIG. 4 shows a voltage output spectrum of an inverter without network filter.

The diagram in FIG. 4 shows an example of the voltage output spectrum of an inverter 10 without network filter. Plotted on the abscissa axis is the frequency and plotted on the ordinate axis is the normalized voltage. Characteristic here is the fundamental wave useful component at network frequency (here 50 Hz), a maximum in the vicinity of the average switching frequency (depending on the modulation type, here PWM) and spectral components at multiples of the switching frequency with diminishing amplitude. The switching frequency amounts to 4 kHz in the situation shown.

A change in the average switching frequency leads in a first approximation to a corresponding displacement of the switching frequency spectral components, while the amplitudes and the fundamental wave component remain unchanged. This explains why, in conjunction with a network filter 20 with increasing filter effect above a resonance frequency (see FIG. 2) for example, an increase of the switching frequency leads to lower switching-frequency voltage components at the point of common coupling 18.

The diagrams in FIG. 5, FIG. 6 and FIG. 7 show examples for different filter topologies, which differ in their component costs and frequency curves and accordingly are selected depending on inverter type, on the switching frequency or on the modulation method. Shown on the left in each case is the inverter 10 and shown on the right is the network 14.

A network filter 20 with passive attenuation in accordance with FIG. 5 reduces the excessive resonance shown in FIG. 1, wherein instead of the real resistance shown, the resistance can also be realized parasitically, for example by the line or the capacitor. The choking of the transverse path of the network filter 20 shown in FIG. 6 brings new dynamic characteristics and creates a minimum in the frequency curve (see FIG. 8) and leads above the minimum to a reduced attenuation. In the variant of a network filter 20 in the form of an LZ filter shown in FIG. 7 it is assumed that the network-side inductance can be omitted, since a minimum inductance is present in the network 14.

Figure 8:
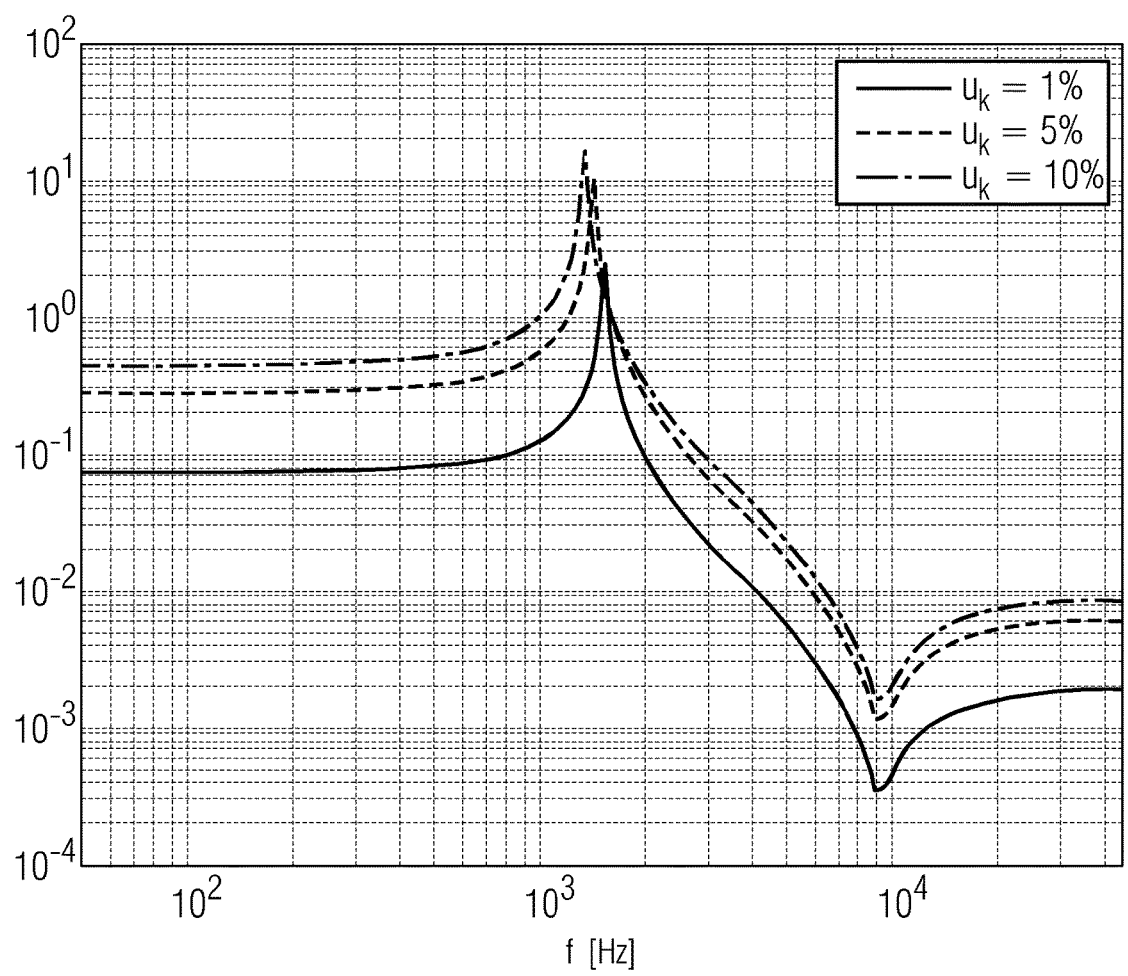
FIG. 8 shows examples for the value frequency curve of the output voltage of a choked LCL network filter at different network inductances and FIG. 9 shows examples for the value frequency curve of the output current of a choked LCL network filter at different network inductances.

The diagram in FIG. 8 shows the value frequency curve of the output voltage (amplitude spectrum of the quotient of the voltage U(PCC) at the point of common coupling 18 and the output voltage U(WR) of the inverter 10) of a choked LCL network filter 20 in accordance with FIG. 6 for different network inductances and corresponding relative network short-circuit voltages $u_K$, here with $u_K=1\%$ $u_K=5\%$ and $u_K=10\%$.

In accordance with the approach proposed here, there is provision for the major components of the switching-frequency interference voltage or of the interference current to lie in a frequency range in which the network filter 20 has a monotonously increasing filter effect. The simple relationship is then produced that, with an increasing frequency, the interference amplitude emitted into the network 14 falls. With this prerequisite the method is applicable to all filter types given here in accordance with FIG. 5, FIG. 6 and FIG. 7 as well as further similar filter types.

As a result of the impedance of the network 14 (inductive) the switching-frequency spectral component in the current through the point of common coupling 18 increases with increasing network short-circuit power and thus, by comparison with the voltage at the point of common coupling 18, shows precisely the reverse behavior. This is also recognizable in the transmission frequency curve for the output current I(PCC) at the point of common coupling 18 as a function of the inverter voltage U(WR), as is shown in the diagram in FIG. 9.

Figure 9:
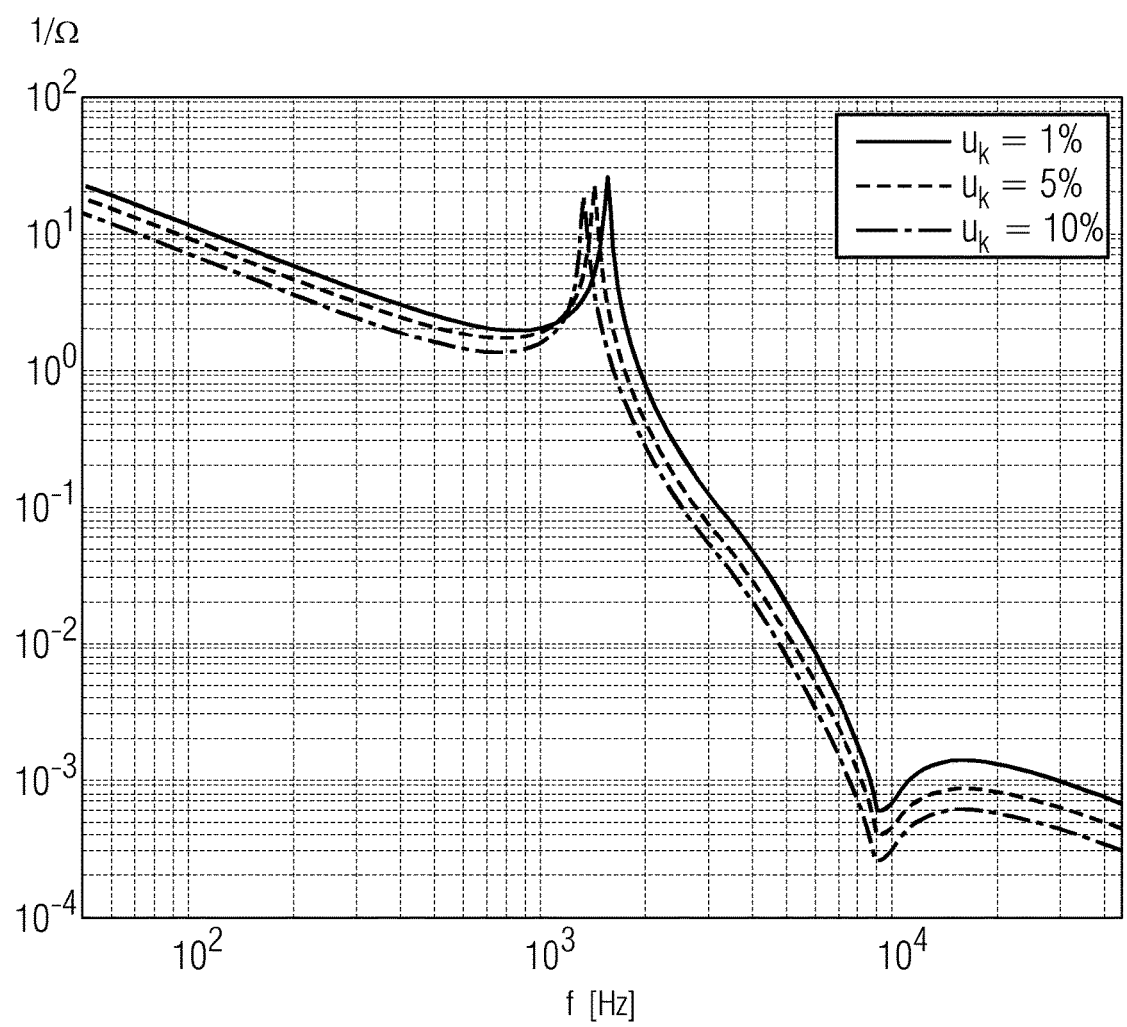

The diagram in FIG. 9 shows the value frequency curve of the output current (amplitude spectrum of the quotient of the current I(PCC) at the point of common coupling 18 and of the output voltage U(WR) of the inverter 10) of a choked LCL network filter 20 in accordance with FIG. 6 for different network inductances and corresponding relative network short-circuit voltages $u_K$, here with $u_K=1\%$ $u_K=5\%$ and $u_K=10\%$.

The rise in the switching-frequency spectral component is explained by the fact that a small network inductance (i.e. high network short-circuit power) presents a small resistance to the switching-frequency current and lets this flow into the network 14.

Depending on a network standard to be noted for the respective application or other application-specific temporal or spatial requirements, the optimization of the switching frequency can be undertaken so that either the voltage disturbances or the current disturbances do not exceed defined, predetermined or predefinable upper limits and optionally, by selecting a switching frequency that is as low as possible, the power dissipation is minimized. For a reduction of the power dissipation attention is paid in advance during filter design to a reduced outlay in materials and in this case a minimized worst-case reserve is adhered to.

The functional units of the return path shown in FIG. 3 will be looked at individually below in detail:

Measuring Unit 22

An important element of the proposed approach is that by means of the measuring unit 22, or generally by means of a data unit 22/data acquisition unit 22, values or measured values at the network-side point of common coupling 18 of the inverter 10 are determined or acquired, in particular measured values relating to the current interference emission of the inverter 10 at the point of common coupling 18 are acquired, and the switching frequency is adapted in relation thereto. As well as the phase currents $I_{WR}$ (FIG. 3) in inverter 10 always measured for inverters 10 for measurement transducers can also be used for this purpose.

To this extent a form of embodiment is shown in the diagram in FIG. 3, in which the voltages across the transverse path of the network filter 20 or the inverter output voltage are measured by means of the measuring unit 22. In addition the inverter currents and/or the currents in the network filter 20 are measured. With known impedance values for the components of the network filter 20, the voltages at the point of common coupling 18 can be calculated therefrom with the aid of the complex alternating current calculation.

As an alternative two or more line-to-line voltages or two or more phase voltages at the point of common coupling 18 can be measured by means of the measuring unit 22.

In an advantageous form of embodiment of the invention, in accordance with the sampling theorem, a sampling frequency used by the measuring unit 22 for the measurements is selected as at least twice as large as the limit frequency up to which the spectrum of the output voltage must be monitored and evaluated as regards adherence to the standards required in each case. If for example a frequency range of up to 10 kHz is of decisive importance, then a sampling period of a maximum of 50 µs is used for the measurement.

An alternate approach for measuring and calculating the voltage spectrum at the point of common coupling 18 consists of the effective differential network impedance being defined continuously by means of a data unit 22. An option for doing this is provided by the following relationship for the overall inductance:

$$L_{total} = \left| \frac{U_{WR} - U_{Netz}}{(\Delta I_{WR})/(\Delta t)} \right|.$$

In this case the current change in current $\Delta I_{WR}$ which arises during a short period of time $\Delta t$ in which no switching action of the semiconductor switches has been carried out (e.g. $\Delta t = 50$ µs) is determined or measured by means of the data unit 22. The inverter voltage $U_{WR}$ and the network voltage $U_{Netz}$ in this case may be assumed to be constant with sufficient accuracy. For the overall inductance calculated in this way, the known inductance of the network filter 20 can be derived, in order to obtain an estimated value for the network inductance $L_N$. From the network inductance $L_N$ estimated by means of the data unit 22, with a known emission spectrum of the inverter 10, the voltage spectrum at the point of common coupling 18 can be calculated with the aid of the complex alternating current calculation for the circuit under consideration.

Evaluation Unit 24, Assessment Unit 26

The measured voltage values recorded by means of the measuring unit 22 are recorded for a sufficiently long period of time to also acquire the signal components at small frequencies. At least one network period is a sensible period.

The value spectrum |F(f)| of these measured values is calculated at cyclic intervals (e.g. once per second) by means of the evaluation unit 24. The processor power needed for this is typically available at current inverters 10.

In this context it should be pointed out that the measuring unit 22, the evaluation unit 24, the assessment unit 26 and the adapter unit 28 do not have to be physical units independent of the inverter 10, but can be included in the inverter 10 as corresponding functions/functional units, for example in the form of an implementation of the respective function in hardware, firmware and/or software.

The calculated value spectrum is compared by means of the assessment unit 26 with a previously selected limit spectrum |G(f)|, describes the permitted interference voltage components in the frequency range to be monitored $f_{Min} \ldots f_{Max}$. The maximum of the difference between the calculated value spectrum (actual spectrum) and the limit spectrum can be used for a frequency regulation for example.

Optionally the Relative Total Harmonic Distortion (THD)

$$THD_U = \frac{\sqrt{U_n^2 + U_{n+1}^2 + \ldots + U_k^2}}{U_1}$$

in the frequency range to be monitored of between $n \cdot f_{netz} = f_{Min}$ to $k \cdot f_{Netz} = f_{Max}$ is calculated by means of the assessment unit 26, i.e. the sum of the squares of all spectral amplitudes. Typically the relative total harmonic distortion (THD) may likewise not exceed a predetermined or predefinable limit value. The THD can also be calculated for the current in a similar way.

In a basically optional additional consideration of the total harmonic distortion, as a result of the observation of the limit spectrum, it is calculated on the one hand whether the individual spectral lines exceed a specific height, and on the other hand, as a result of observing the total harmonic distortion, it is additionally checked whether the sum of all spectral lines adheres to a limit value. In the observation of the total harmonic distortion this can also be weighted, by the individual summands below the square root being weighted with suitably predetermined factors.

Adapter Unit 28

By means of the assessment unit 26, in the assessment step carried out by said unit, a quality criterion is calculated or a number of quality criteria are calculated, namely at least the maximum of the difference between the calculated value spectrum and the limit spectrum or optionally the maximum of the difference between the calculated value spectrum and the limit spectrum and also in addition the relative total harmonic distortion. A cyclic adaptation of the switching frequency of the inverter 10 is undertaken on the basis of the quality criterion or the quality criteria by means of the adapter unit 28. For a switching frequency that is currently too small the harmonic component in the voltage (or in the current) is too large. On the basis of the observation of the limit spectrum, the result in this case will be that at least one individual spectral line exceeds a limit value predetermined by the limit spectrum. On the basis of the optional observation of the total harmonic distortion the result can moreover be that this is exceeding a predetermined limit value. Since as a result of the filter characteristic of the network filter 20 the harmonic component falls with increasing switching frequency, a new, higher switching/pulse frequency will be predetermined for the next assessment cycle.

There are a number of options to be considered for this. Two options are described below and summarized as an iterative adaptation of the switching frequency:

In accordance with a heuristic approach the switching frequency of the inverter 10 is increased by a predetermined or predefinable, in particular parameterizable, factor or offset, if one of the quality criteria lies above the limit value, thus if for example, at at least one frequency, the amplitude of the value spectrum |F(f)| of the measured voltage values recorded by means of the measuring unit 22 lies above a limit predetermined for example by the limit spectrum |G(f)|. If one of the quality criteria lies in a tolerance band below the limit value, then the switching frequency is retained. If all quality criteria lie below the tolerance band, then the switching frequency of the inverter 10 is reduced by a predetermined or predefinable, in particular parameterizable, factor or offset.

As an alternative an adapter unit 28 functioning as a proportional control is considered for the adaptation of the switching frequency of the inverter 10. In this case—see below: "spectrum assessment"—a percentage quality criterion is employed, that represents the "critical path" at the moment (i.e. lies furthest above a limit value when a limit value is being exceeded, or—if all limit values are being adhered to—has the smallest distance from the limit values). The leading sign-related deviation from the limit value is weighted with a predetermined or predefinable, in particular parameterizable, positive factor K and produces a momentary frequency offset $\Delta f_{Schalt}$, which will be added to the respective nominal value of the switching frequency $\Delta f_{Schalt,nml}$:

Spectrum Assessment:

$$\Delta f_{Schalt,1} = K_1 \cdot \max_f \left\{ \frac{|F(f)| - |G(f)|}{|G(f)|} \right\}, f = f_{Min} \ldots f_{Max}$$

Optional THD Assessment:

$$\Delta f_{Schalt,2} = K_2 \cdot \left\{ \frac{THD_U(f_{Schalt,aktuell}) - THD_{U,Grenzwert}}{THD_{U,Grenzwert}} \right\}$$

Controller:

$f_{Schalt,neu} = f_{Schalt,nml} + \Delta f_{Schalt,1}$ or $f_{Schalt,neu} = f_{Schalt,nml} + \text{Max}\{\Delta f_{Schalt,1}, \Delta f_{Schalt,2}\}$ If the limit values are adhered to, the switching frequency is reduced—also with the heuristic approach previously described above. The step-by-step minimization of the switching frequency and the resulting minimization of the power dissipation is based, for the iterative adaptation of the switching frequency, on this reduction of the switching frequency, which occurs until such time as the limit values are adhered to. Unlike in the previously described heuristic adaptation of the switching frequency, the reduction of the switching frequency is not undertaken here with a fixed predetermined step size. Instead the step size in each assessment step occurs a result of the momentary distance to the limit value or the limit values. With a large distance a larger step size results and accordingly a greater reduction of the switching frequency. A small distance accordingly results in a smaller step size and a smaller reduction of the switching frequency. In the event of a violation of the limit values the switching frequency is increased and the degree of the increase of the switching frequency is—in a similar way to the previously described reduction of the switching frequency—dependent on the extent of the violation of the limit values.

The basically optional assessment of the total harmonic distortion THD or of the overall interference current can be activated by means of the factor $K_2$. With $K_2=0$ the assessment of the total harmonic distortion is deactivated. On this basis a deactivation of the spectrum assessment is likewise possible, so that the switching frequency is then only adapted on the basis of the assessment of the total harmonic distortion. Equally a free weighting of the two possible influencing factors for the determination of the new switching frequency in each case is possible by means of a suitable selection of the factors $K_1$ and $K_2$. Basically the total interference current or the total interference power calculated from current and voltage can also be used as an alternate criterion.

Formulated in general terms, a switching frequency at which at least the adherence to the quality criterion or the quality criteria is guaranteed, i.e. a switching frequency that does not lead to any limit value violation, is selected by means of the adapter unit 28. Furthermore the switching frequency is reduced by means of the adapter unit 28, where this is possible within the framework of adhering to the limit values. With the resulting reduction of the switching frequency the power dissipation advantageously falls. However with increasing reduction of the switching frequency the filter effect of the network filter 20 also becomes worse, as can be seen for example with reference to the filter frequency curve shown in FIG. 2. As a consequence the reduction of the switching frequency comes to its end where, because of the reduced filter effect of the network filter 20, an interference emission of the inverter 10 results, which leads to a violation of at least one limit value. Then the switching frequency is increased, in the heuristic approach outlined above, by a predetermined or predefinable value or in the approach by means of a proportional controller, by a value dependent on the extent of the violation of the limit value or of each limit value.

Obvious expansions of such a control functionality (proportional control) of the adapter unit 28 are integral components for control deviation (PI controller), additional differentiating signal paths (PD controller) and tolerance bands. In the latter case for example no change is made to the switching frequency of the inverter 10 if the new switching frequency lies in a range $f_{Schalt,nml,min} < f_{Schalt,nml}$ to $f_{Schalt,nml}$.

In addition or as an alternative the dynamics of the control can be adapted as desired by means of digital smoothing elements in the actual value signal path (signal path to the adapter unit 28) and/or in the output signal path (signal path from the adapter unit 28 to the inverter 10). To this extent the use of a smoothing element with PT1 behavior comes into consideration.

Depending on local requirements a consideration and assessment of the current spectrum at the point of common coupling 18 can also be required. The described steps for adapting the frequency will then be expanded by the corresponding variables for the quality of the current spectrum $THD_1$ and/or for the quality of a spectrum able to be calculated from current and voltage values, for example a power spectrum.

By means of the monitoring of the voltage spectrum and/or by means of the monitoring of at least one other quality criterion, adherence to the limit values is guaranteed even if further switching-frequency inverters 10 or non-linear loads are connected to the same point of common coupling 18 for example. It should be noted that then a sufficiently large smoothing of the change in switching frequency must be realized, in order to prevent switching-frequency oscillations or fluctuations. A D component in the control likewise has an attenuating effect on the system behavior.

Optionally, in an iterative adaptation of the switching frequency, there is also an adaptation of the step size resulting in each case. In a method expanded to this extent, with a switching frequency above a (dimensioning) switching frequency defined for the inverter 10, with increasing switching frequency the step size is reduced for a further increase in the switching frequency and/or the step size is increased for a lowering of the switching frequency. As an alternative or cumulatively, below the (dimensioning) switching frequency, the step size is reduced for a further lowering of the switching frequency and the step size is increased for an increase in the switching frequency. The result achieved by such and expansion of the method is that each inverter 10 is given a tendency to operate in the range of its dimensioning switching frequency.

This can be further supplemented by the adaptation of the resulting step sizes being undertaken such that a difference between the step size for an increase of the switching frequency and the step size for a reduction of the switching frequency increases with an increasing distance from the dimensioning switching frequency defined for the inverter 10.

The assessment system can also operate if the inverter 10 is not clocked (pulse inhibition) and is thus not emitting any interference voltages. This is sensible for establishing the advance load of the network 14 and for notifying the user about the network status if necessary. Moreover it makes it possible to clarify a "question of guilt" if the network standards are not being adhered to during operation of the inverter 10, if other network users are the cause of the disruption.

Calculating the Minimum Possible Switching Frequency in Advance

Since frequently the permitted voltage emissions of a device fall with increasing switching frequency, it can be that an increase of the switching frequency does not improve the network compatibility or a reduction of the switching frequency does not worsen the network compatibility. To this extent the case can arise that the adaptation of the switching frequency described above does not lead to any satisfactory solution. Whether this is so or not depends on the course of the filter transmission function and the limit value curve underlying the limit spectrum over the frequency. In concrete terms this behavior occurs when the gradient of the limit value curve is greater than the gradient of the filter transmission function.

In order to determine the minimum switching frequency for all known courses of filter transmission functions and limit value curves, which is required in network-connected inverters, in a particular form of embodiments of the approach proposed here not only are values determined at the network-side point of common coupling 18 of the inverter 10, in particular by means of a data unit 22 functioning as measuring unit but the voltage at the point of common coupling 18 is measured by means of the data unit 22. On the basis of this determination or measurement it is also estimated how the emission curve at the point of common coupling 18 will look for a changed switching frequency, in particular for a switching frequency changed in accordance with sequence described above. This emission curve at the point of common coupling 18 is dependent on the frequency-dependent network impedance present at the time of analysis. As described above, this can be established from the voltage measurement, the knowledge of the spectrum of the current $I_{WR}$ of the inverter 10 and the transmission function of the network filter 20. The estimated emission curve at the point of common coupling 18 for a changed switching frequency is obtained by the transmission function established from the established impedance of the network inductance 16 and the known topology of the network filter 20 (see FIG. 2) being applied to the emission spectrum of the current $I_{WR}$ of the inverter 10 expected at the changed switching frequency.

This calculated emission curve is compared with the limit value curve and it is evaluated whether the limit values are being adhered to. The comparison can be made by means of the data I measuring unit 22 or by means of the adapter unit 28. This calculation is advantageously begun at the lowest possible switching frequency. If the limit values are adhered to at this frequency, this switching frequency is selected and thus the best possible efficiency is achieved. This is an example for a switching frequency of the inverter 10 being adapted as a function of the result of the comparison, namely the result that the limit values are being adhered to. The switching frequency can likewise be selected and the resulting switching frequency pre-specified for the inverter 10 by means of the data/measuring unit 22 or by means of the adapter unit 28.

If the limit values are not being adhered to, then the calculation (by means of the data/measuring unit 22 or by means of the adapter unit 28) is repeated with a switching frequency increased by a predefinable or predetermined step size (e.g. 100 Hz). These repetitions are continued until such time as a switching frequency is found with which the limit value curve is adhered to. This is an example for a switching frequency of the inverter 10 being adapted, namely iteratively adapted, as a function of the result of the comparison, namely the result that the limit values are not being adhered to. If the limit value curve is not adhered to at the maximum possible switching frequency, then a warning can be issued to the operator of the device including the inverter 10 that this is not operating with the standards-compliant network perturbations at the moment.

The advance calculation of the minimum possible switching frequency is always undertaken for example during switching-on of the respective device that includes the inverter system 12. As an alternative or in addition the advance calculation can also be undertaken on a regular basis during the otherwise iterative adaptation of the switching frequency, for example by there being an advance calculation of the switching frequency at predetermined or predefinable, in particular equidistant, points in time and by the established minimum possible switching frequency being used to a certain extent as a start value for an iterative adaptation (correction) of the switching frequency occurring up to the next advance calculation.

To this extent the advance calculation of the minimum possible switching frequency can sensibly supplement the iterative adaptation of the switching frequency described above, for example by the minimum possible switching frequency being established by means of the advance calculation when the device is switched on and by this thus being used as the optimum start value for further operation and load-related adaptations. With a regular advance calculation this can also replace the iterative adaptation of the switching frequency. To this extent the advance calculation of the minimum possible switching frequency also involves an aspect of the innovation presented here independent of a previously described iterative adaptation of the switching frequency.

A return path 30 with a data unit 22 for determination/measurement of the relevant values and an adapter unit 28 are sufficient for carrying out such an adaptation of the switching frequency based on an advance calculation. Optionally the function of the data unit 22 and the adapter unit 28 can also be combined into a single unit, so that the return path 30 then—depending on how it is considered—just comprises a data unit 22 or just an adapter unit 28. An inverter system 12 with an inverter 10 and a network filter 20 exclusively intended for exclusively carrying out such a method accordingly comprises a data unit 22 and/or an adapter unit 28, wherein by means of the data or adapter unit 22, 28 at the network-side point of common coupling 18 of the inverter 10 values, in particular measured values relating to the current interference emission of the inverter 10 at the point of common coupling 18, are able to be determined, wherein by means of the data or adapter unit 22, 28 an estimated course of an emission curve is able to be established, wherein the estimated emission curve is compared with a predetermined or predefinable limit by means of the data or adapter unit 22, 28 and wherein, depending on the result of the comparison, a switching frequency of the inverter 10 is able to be adapted by means of the data or adapter unit 22, 28.

Power Dissipation Observation

Regardless of the switching topology of the inverter 10 and the type of power semiconductors used in the inverter 10, it is true to say that the switching losses increase with the level of the switching frequency. The efficiency of the inverter 10 can thus be increased if the switching frequency—as described—is always selected to be as low as possible.

For the losses in the overall system of inverter 10 and network filter 20 it is to be noted however, that with a smaller switching frequency the current ripple (current component in the switching-frequency range) increases and thereby the losses in network filter 20, specifically in the commutation choke, increase. In the individual case it is therefore to be assessed whether an overall reduction of the losses will be achieved. As a rule however the increased loss in the choke is lower than the gain in the inverter 10. Even if this should not be the case, the approach proposed here can be sensible, since the thermal time constants of the choke or chokes are significantly larger than the thermal time constants of the power semiconductors. Thus the approach can help in overcoming overload situations. Moreover an increase in the average cooling power for the network filter 20 is frequently able to be realized technically more easily and at lower cost than a corresponding cooling power increase for the power semiconductors of the inverter 10.

Although the invention has been illustrated in greater detail and described by the exemplary embodiment, the invention is not restricted by the disclosed examples and other variations can be derived herefrom by the person skilled in the art, without departing from the scope of protection of the invention.

Individual prominent aspects of the description provided here can thus be briefly summarized as follows: A method for operating an inverter system 12 and an inverter 10 operating according to the method are specified, wherein a switching frequency is established, which satisfies predetermined or predefinable quality criteria, wherein the switching frequency is reduced for as long as the quality criteria are being adhered to and a corresponding limit value or corresponding limit values is or are not being violated. By the switching frequency of the inverter 10 being reduced for as long as there is no limit value violation, a reduction in the power losses is advantageously produced. If a limit value violation occurs during operation, the switching frequency is increased, until the limit value violation no longer exists. For the underlying operating state or load state in each case this switching frequency is a switching frequency that satisfies the quality criterion or the quality criteria, and also the increased switching frequency is an optimum switching frequency in the sense that this represents the minimum possible switching frequency for the operational state or load state.

The innovation presented here is thus a method for operation of an inverter system 12 and a corresponding inverter system 12, which comprises an inverter 10, a network filter 20 and a return path 30 from the network filter 20 to the inverter 10, wherein values or measured values relating to a current interference emission of the inverter 10 are determined or acquired by means of a data or measuring unit 22, wherein a measure for the current interference emission, in particular a value spectrum of the acquired values or measured values, is established by means of an evaluation unit 24, wherein the measure for the interference emission, in particular the value spectrum, is compared with a predetermined or predefinable limit value or limit spectrum by means of an assessment unit 26 and wherein a switching frequency of the inverter 10 is able to be adapted and is adapted during operation as a function of the result of the comparison by means of an adapter unit 28 following the data or measuring unit 22, the evaluation unit 24 and the assessment unit 26 in the return path 30.

The invention claimed is:

1. A method for operating an inverter system which has an inverter, a network filter and a return path from the network filter to the inverter, with the return path comprising a data unit, an evaluation unit, an assessment unit and an adapter unit arranged in sequence, the method comprising:
   measuring with the data unit voltage and/or current values at the network filter of the inverter,
   determining with the evaluation unit from the measured voltage and/or current values a voltage spectrum, a current spectrum or a power spectrum as-a value spectrum,
   comparing with the assessment unit the value spectrum with a predetermined limit spectrum,
   adapting with the adapter unit a switching frequency of the inverter depending on a result of the comparison, and
   at least one of:
      selecting, above a rated switching frequency defined for the inverter, a step size for adapting the switching frequency to a higher switching frequency to be smaller than a step size for adapting the switching frequency to a lower switching frequency, and
      selecting, below a rated switching frequency defined for the inverter, a step size for adapting the switching frequency to a higher switching frequency to be larger than the step size for adapting the switching frequency to a lower switching frequency.

2. The method of claim 1, further comprising determining with the assessment unit a relative total interference voltage and/or a total interference current and/or a total interference power and taking the determined total interference voltage and/or the total interference current and/or the total interference power additionally into account when comparing the value spectrum with the limit spectrum for adapting the switching frequency of the inverter.

3. The method of claim 1, further comprising precomputing a minimum possible switching frequency and using the precomputed minimum possible switching frequency as a basis for adapting the switching frequency based on the comparison of the value spectrum with the limit spectrum.

4. The method of claim 1, wherein the voltage and/or current values are measured with the data unit during an operating situation in which the inverter is not switching, and wherein the switching frequency adapted with the adapter unit is used when the operating situation in which inverter is not switching has ended.

5. The method of claim 1, wherein a difference between the step size for increasing the switching frequency and the step size for reducing the switching frequency increases as a distance from the rated switching frequency increases.

6. A computer program comprising program code stored on a non-transitory medium, wherein when the computer code is loaded into a memory of a control unit of an inverter system and executed by the control unit, the control unit causes the inverter system, which includes an inverter, a network filter and a return path from the network filter to the inverter, with the return path comprising a data unit an evaluation unit, an assessment unit and an adapter unit arranged in sequence, to:
  determine with the data unit voltage and/or current values at the network filter of the inverter,
  determine with the evaluation unit from the measured voltage and/or current values a voltage spectrum, a current spectrum or a power spectrum as a value spectrum,
  compare with the assessment unit the value spectrum with a predetermined limit spectrum,
  adapt with the adapter unit a switching frequency of the inverter depending on a result of the comparison, and to at least one of:
    select, above a rated switching frequency defined for the inverter, a step size for adapting the switching frequency to a higher switching frequency to be smaller than a step size for adapting the switching frequency to a lower switching frequency, and
    select, below a rated switching frequency defined for the inverter, a step size for adapting the switching frequency to a higher switching frequency to be larger than the step size for adapting the switching frequency to a lower switching frequency.

7. An inverter system, comprising an inverter, a network filter and a return path from the network filter to the inverter, wherein the return path comprises a data unit, an evaluation unit, an assessment unit and an adapter unit arranged in sequence, wherein
  the data unit is configured to measure voltage and/or current values at the network filter of the inverter,
  the evaluation unit is configured determine from the measured voltage and/or current values a voltage spectrum, a current spectrum or a power spectrum as a value spectrum,
  the assessment unit is configured to compare the value spectrum with a predetermined limit spectrum,
  the adapter unit is configured to adapt a switching frequency of the inverter depending on a result of the comparison by at least one of
    selecting, above a rated switching frequency defined for the inverter, a step size for adapting the switching frequency to a higher switching frequency to be smaller than a step size for adapting the switching frequency to a lower switching frequency, and
    selecting, below a rated switching frequency defined for the inverter, a step size for adapting the switching frequency to a higher switching frequency to be larger than the step size for adapting the switching frequency to a lower switching frequency.

* * * * *